United States Patent
Kawakami et al.

(10) Patent No.: US 8,350,896 B2
(45) Date of Patent: Jan. 8, 2013

(54) TERMINAL APPARATUS, DISPLAY CONTROL METHOD, AND DISPLAY CONTROL PROGRAM

(75) Inventors: Takashi Kawakami, Tokyo (JP); Hiroyuki Kawakami, Kanagawa (JP); Kenta Ohmori, Tokyo (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 547 days.

(21) Appl. No.: 12/581,398

(22) Filed: Oct. 19, 2009

(65) Prior Publication Data

US 2010/0123772 A1      May 20, 2010

(30) Foreign Application Priority Data

Nov. 19, 2008   (JP) ................................. 2008-295582

(51) Int. Cl.
  *H04N 13/04* (2006.01)
(52) U.S. Cl. .......................................... 348/51; 348/42
(58) Field of Classification Search ................ 348/42, 348/51
  See application file for complete search history.

(56) References Cited

U.S. PATENT DOCUMENTS

| | | | |
|---|---|---|---|
| 5,579,026 A | 11/1996 | Tabata | |
| 6,009,210 A | 12/1999 | Kang | |
| 6,034,717 A * | 3/2000 | Dentinger et al. | 348/51 |
| 6,330,356 B1 * | 12/2001 | Sundareswaran et al. | 345/648 |
| 2005/0213810 A1 | 9/2005 | Sabe et al. | |
| 2005/0219694 A1 | 10/2005 | Vesely et al. | |
| 2006/0244745 A1 * | 11/2006 | Majer et al. | 345/419 |
| 2007/0122027 A1 * | 5/2007 | Kunita et al. | 382/154 |
| 2007/0279319 A1 * | 12/2007 | Yamazaki et al. | 345/32 |
| 2007/0298882 A1 | 12/2007 | Marks et al. | |
| 2009/0207322 A1 * | 8/2009 | Mizuuchi et al. | 348/745 |
| 2012/0044249 A1 * | 2/2012 | Mashitani et al. | 345/419 |

FOREIGN PATENT DOCUMENTS

| | | |
|---|---|---|
| EP | 0 874 303 A1 | 10/1998 |
| EP | 2 075 761 A1 | 7/2009 |
| JP | 2003-108980 | 4/2003 |
| JP | 2003-117144 | 4/2003 |
| JP | 2005-284487 | 10/2005 |
| JP | 2007-260232 | 10/2007 |

OTHER PUBLICATIONS

European Examination Report issued on Feb. 24, 2011 in corresponding European Application No. 09 175 136.2.
Chinese Office Action issued Dec. 13, 2011 in patent application No. 200910222864.7.

* cited by examiner

*Primary Examiner* — Phuoc Nguyen
(74) *Attorney, Agent, or Firm* — Oblon, Spivak, McClelland, Maier & Neustadt, L.L.P.

(57) ABSTRACT

A terminal apparatus includes: a display unit configured to display a projection image of a three-dimensional object on a two-dimensional display screen; an imaging unit configured to capture an image of an operator who is in a state of viewing the display screen; a changing unit configured to change a viewpoint position relative to the three-dimensional object in response to a position of an image of the operator's face relative to the captured image; and a projection image generator configured to obtain a projection image generated by projecting each portion of the three-dimensional object viewed from the viewpoint position onto a predetermined projection plane.

10 Claims, 9 Drawing Sheets

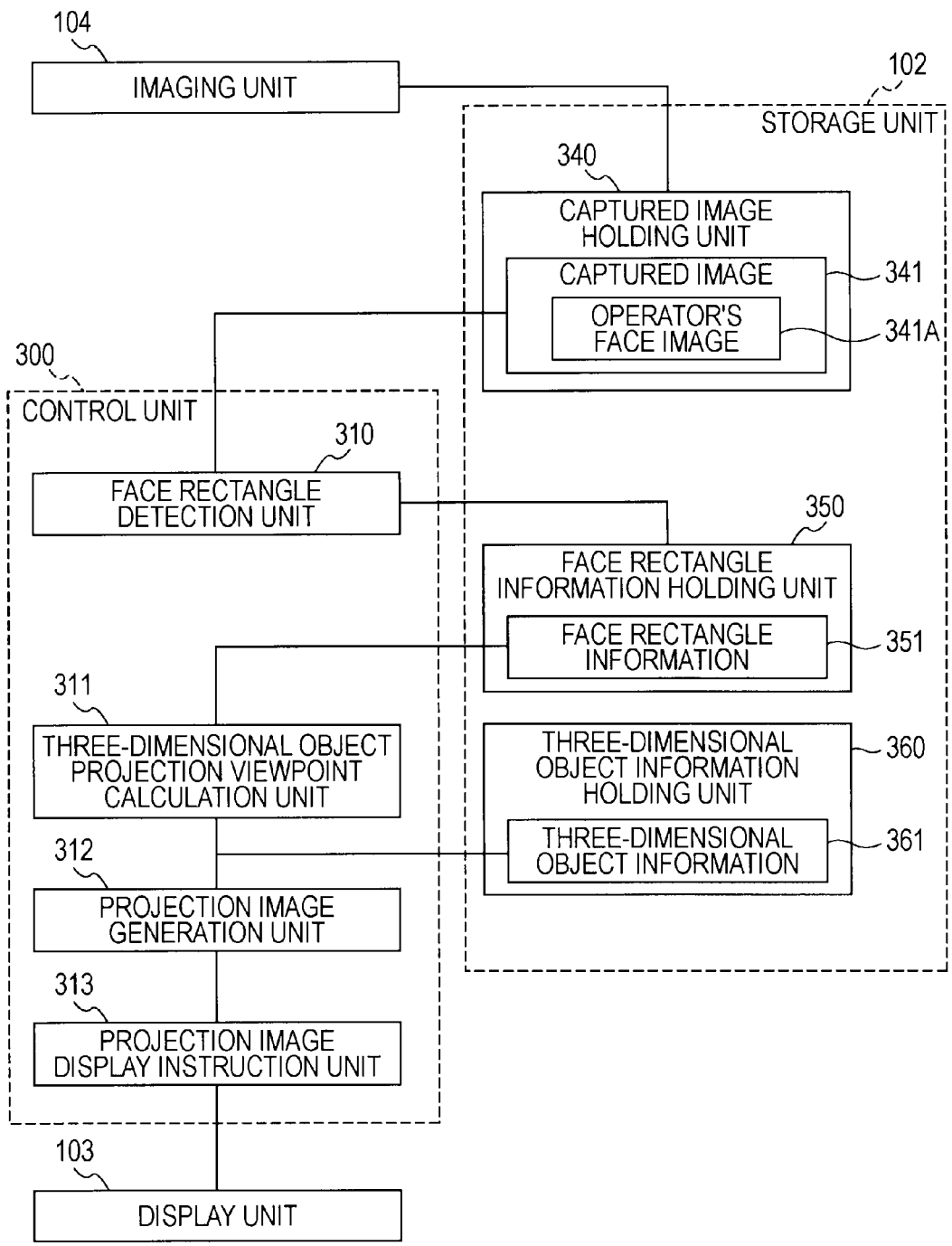

DISTANCE BETWEEN
OPERATOR'S EYES

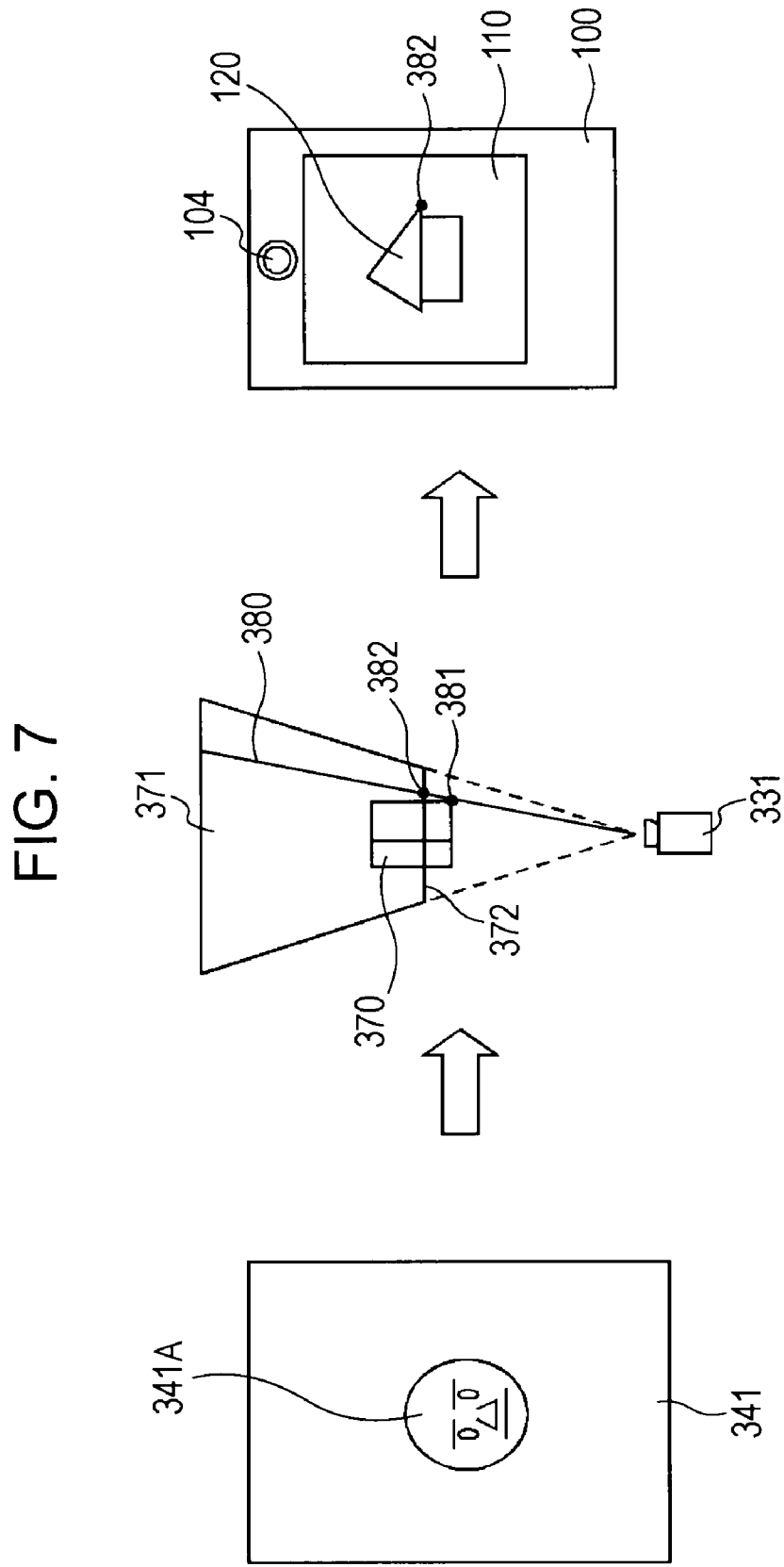

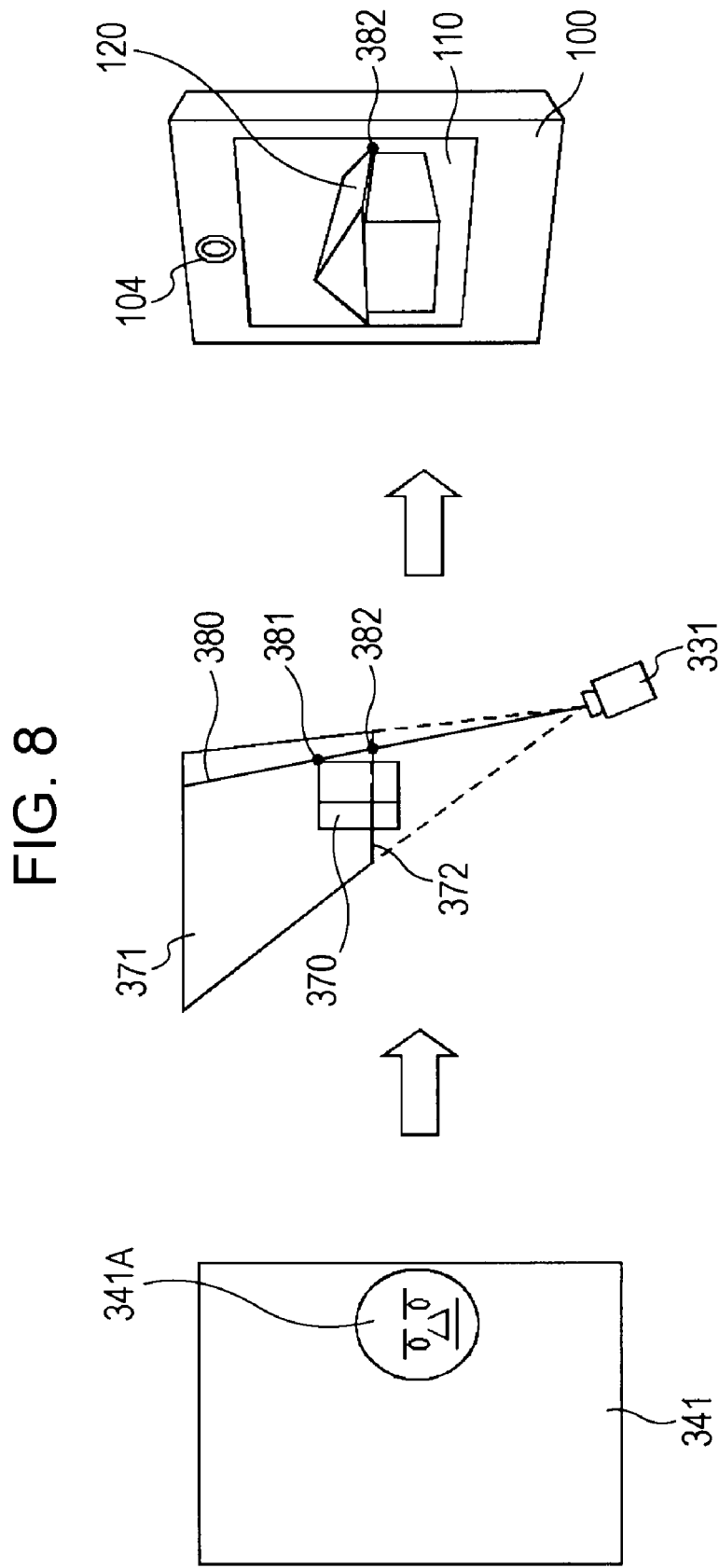

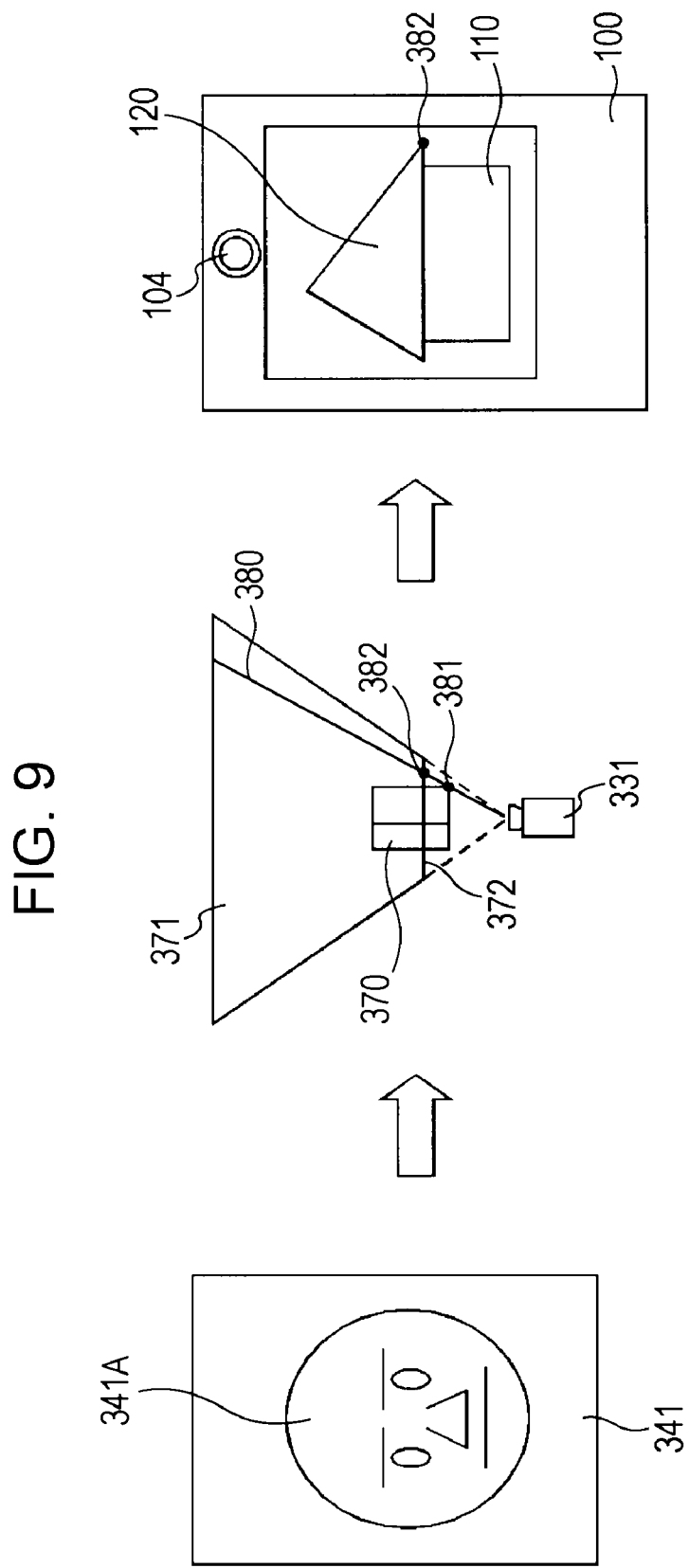

500
TERMINAL APPARATUS, DISPLAY CONTROL METHOD, AND DISPLAY CONTROL PROGRAM

BACKGROUND OF THE INVENTION

1. Field of the Invention

The present invention relates to a terminal apparatus, a display control method, and a display control program for displaying a projection image of a three-dimensional object on a two-dimensional display screen.

2. Description of the Related Art

There are terminal apparatuses that display a projection image of a three-dimensional object on a display device. By displaying such image of a three-dimensional object so as to be operable by an operator, improvements in convenience and viewability can be expected.

A technique of enabling display control, such as changing a viewpoint, to be performed on such a projection image of a three-dimensional object on a display screen by operating a controller is proposed (see Japanese Unexamined Patent Application Publication No. 2007-260232). The controller operations are not limited to simple button pressing operations. The controller operations include measuring and using changes in position or posture of the controller itself.

Moreover, there is also proposed a technique in videophone applications where images of operators are transmitted and received by one operator transmitting an image of a CG character to other operators instead of transmitting an image of his/her own face. In such applications, the operator's head posture information and facial expression are measured, and movements of the CG character are controlled on the basis of the measurement results (see Japanese Unexamined Patent Application Publication No. 2003-108980).

A technique of promptly determining a face image from a captured image with a small amount of calculation is also proposed (see Japanese Unexamined Patent Application Publication No. 2005-284487).

SUMMARY OF THE INVENTION

By displaying an image of a three-dimensional object and operating the displayed image of the three-dimensional object as described above, effects such as more realistic display can be expected.

A viewpoint concerning the image of a three-dimensional object on a display screen of a terminal apparatus can be changed by performing an operation on a three-dimensional viewpoint position corresponding to a camera position for obtaining an image of the three-dimensional object projected on a projection plane, and an operation on the three-dimensional object corresponding to a subject of the camera.

However, input functions of the terminal apparatus such as a mobile terminal are limited, which makes it difficult for the user to execute such operations as he/she wishes.

To simplify the operations, the operator may perform the operation only on the three-dimensional object without performing the operation on the three-dimensional viewpoint position. In this case, however, it is difficult to ensure viewability in response to a change in viewpoint.

In addition, there is a technique of performing an operation of tilting the mobile terminal by incorporating a device such as an acceleration sensor or a gyro for intuitively changing the three-dimensional viewpoint position. However, the posture of the operator or the mobile terminal is also limited in such a technique.

Thus, while the advantages of three-dimensional object display are hardly sufficiently enjoyed without the complex viewpoint change, in reality it is troublesome for the operator to perform the complex operation for changing the viewpoint.

In the related art, even though the three-dimensional object is handled, an image of the three-dimensional object projected on the two-dimensional projection plane appears flat and conveys only limited realism. To realize a stereoscopic display on the two-dimensional display device, it is important to grasp a positional relationship between the operator and the display device. For realizing a stereoscopic display on the two-dimensional display device, there is a technique of using an infrared receiver. However, the operator additionally installs a device for receiving infrared radiation in order to adopt this technique, which causes a significant load to the operator.

It is desirable to provide a terminal apparatus having a two-dimensional display screen in which display control of a three-dimensional object is performed intuitively by easy operations.

A terminal apparatus according to an embodiment of the present invention includes: a display unit configured to display a projection image of a three-dimensional object on a two-dimensional display screen; an imaging unit configured to capture an image of an operator who is in a state of viewing the display screen; means for changing a viewpoint position relative to the three-dimensional object in response to a position of an image of the operator's face relative to the captured image; and projection image generation means for obtaining a projection image generated by projecting each portion of the three-dimensional object viewed from the viewpoint position onto a predetermined projection plane.

The image of the operator who is in a state of viewing the display screen is captured by the imaging unit, and the position of the operator's face image relative to the captured image is determined to thereby change the viewpoint position of the three-dimensional object. Thus, the operator can perform an input operation simply by moving his/her face relative to the imaging unit, without performing any manual operation. Moreover, the projection image generated by projecting each portion of the three-dimensional object viewed from the viewpoint position onto the predetermined projection plane is obtained by the projection image generation means, so that the three-dimensional object is projected and displayed in perspective according to the viewpoint position.

The projection image generation means may change the viewpoint position so that the viewpoint position follows the movement of the operator's face along the display screen. Accordingly, the projection image is dynamically changed with the movement of the face, as if the operator viewed the actual three-dimensional object.

The projection image generation means may change the viewpoint position so that a distance from the three-dimensional object to the viewpoint position changes in response to the size of the image of the operator's face relative to the captured image. Accordingly, the three-dimensional object is displayed in a large size as the face approaches the three-dimensional object, as if the operator viewed the actual three-dimensional object.

Steps included in a display control method and steps executed by a display control program according to another embodiment of the present invention are a display control method for displaying a three-dimensional object in a terminal apparatus that includes an imaging unit and a display unit having a two-dimensional display screen, the display control method including the steps of: capturing an image of an operator who is in a state of viewing the display screen by the imaging unit; changing a viewpoint position relative to the three-dimensional object in response to a position of an image of the operator's face relative to the captured image; obtaining a projection image generated by projecting each portion of the three-dimensional object viewed from the viewpoint position onto a predetermined projection plane; and displaying the projection image on the display screen.

According to the embodiments of the present invention, the operator can perform an input in the terminal apparatus by an easy and intuitive method of changing his/her face position. Furthermore, since a three-dimensional image as if viewed from the position of the operator is projected on the projection plane of the terminal apparatus, improved realism can be achieved while enhancing operability of a system that performs three-dimensional object display in the terminal apparatus.

BRIEF DESCRIPTION OF THE DRAWINGS

FIG. 3 is a functional block diagram showing main functions of the mobile terminal in the embodiment of the present invention;

FIG. 7 illustrates a three-dimensional image generation method according to an embodiment of the present invention;

FIG. 8 illustrates the three-dimensional image generation method in the embodiment of the present invention; and FIG. 9 illustrates the three-dimensional image generation method in the embodiment of the present invention.

DESCRIPTION OF THE PREFERRED EMBODIMENTS

Embodiments of the present invention are described in detail below, with reference to the drawings.

Figure 1:
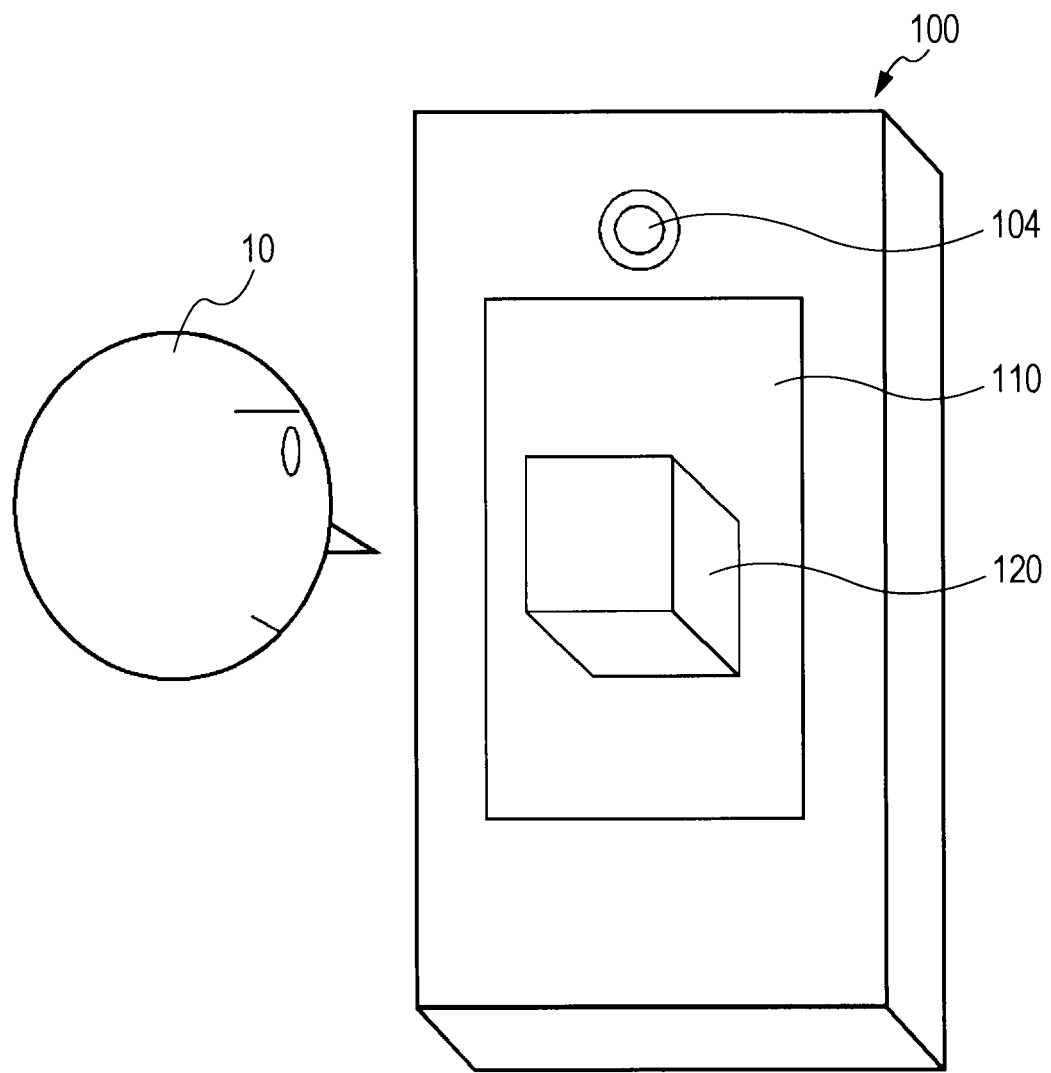
FIG. 1 schematically shows the structure of a mobile terminal according to an embodiment of the present invention.

FIG. 1 schematically shows the structure of a mobile terminal 100 according to an embodiment of the present invention. For example, the mobile terminal 100 is assumed to be a mobile phone terminal.

The mobile terminal 100 includes a display screen 110 on which a three-dimensional object projection image 120 can be displayed, and an imaging unit 104 capable of obtaining an image of a face (face image) of an operator (user) 10 who is viewing the display screen 110. The imaging unit 104 corresponds to a device such as a digital camera that captures the image of the operator who is in a state of viewing the display screen in the embodiment of the present invention. The imaging unit 104 may be an imaging unit for imaging a subject in front of the operator, which is rotated to capture an image of the operator. Alternatively, the imaging unit 104 may be an imaging unit that is different from the imaging unit for imaging the subject and has a lens fixed to face the operator for videophone or the like. Moreover, though not shown in FIG. 1, the mobile terminal 100 includes an operation unit having various operation keys and the like which are typically provided on a mobile phone terminal or the like. The terminal is not limited to a specific type, and may be any of a folding type, a sliding type, a straight type, and so on.

Figure 2:
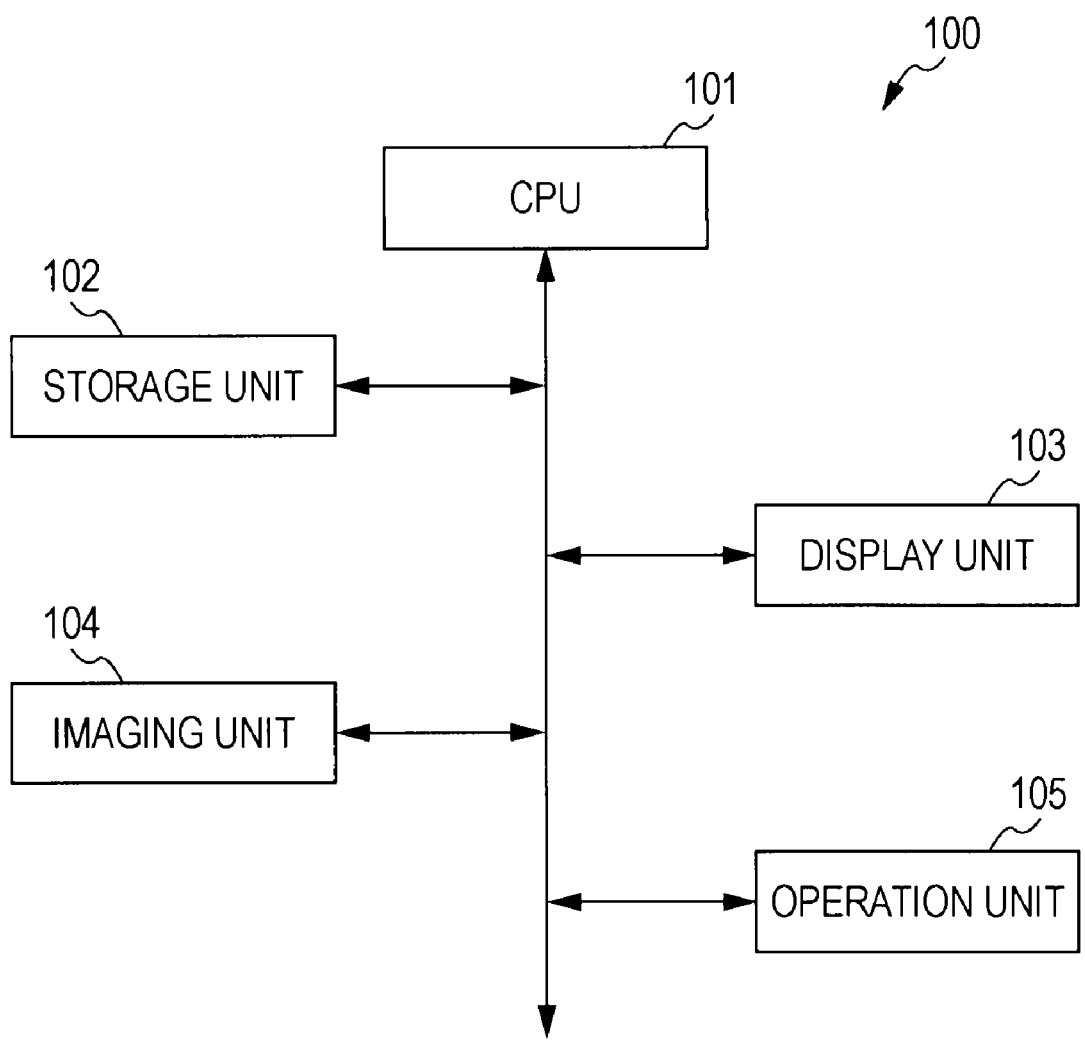
FIG. 2 schematically shows structure of hardware in the mobile terminal shown in FIG. 1.

FIG. 2 schematically shows the structure of hardware in the mobile terminal 100 shown in FIG. 1.

The mobile terminal 100 includes a CPU 101, a storage unit 102, a display unit 103, the imaging unit 104, and an operation unit 105.

The CPU 101 is a part that constitutes a controller in the embodiment of the present invention. The CPU 101 controls the entire mobile terminal 100 and performs various processes by executing various programs.

The storage unit 102 stores the programs executed by the CPU 101 and necessary data. The storage unit 102 may include not only an internal storage device such as a ROM, a RAM, a flash memory, and an HDD but also a removable recording medium. The storage unit 102 also stores three-dimensional object information and captured image information obtained as a result of capturing an image, which will be described later.

The display unit 103 displays the three-dimensional object projection image 120 on the display screen 110 shown in FIG. 1. The display unit 103 includes a display device such as an LCD, an organic EL display, and the like.

The imaging unit 104 captures the image of the face of the operator 10 as described with reference to FIG. 1.

The operation unit 105 receives an input operation of the operator 10 as described with reference to FIG. 1.

Though not shown, the mobile terminal 100 may further include a wireless communication unit, a voice output unit, a GPS unit, and the like which are included in a typical mobile phone terminal.

FIG. 3 is a functional block diagram showing main functions of the mobile terminal 100 in this embodiment.

A control unit 300 includes a face rectangle detection unit 310, a three-dimensional object projection viewpoint calculation unit 311, a projection image generation unit 312, and a projection image display instruction unit 313.

The storage unit 102 includes a captured image holding unit 340 that holds a captured image 341 (containing an operator's face image 341A) obtained by the imaging unit 104, a face rectangle information holding unit 350 that holds face rectangle information 351 obtained on the basis of the captured image, and a three-dimensional object information holding unit 360 that holds three-dimensional object information 361 indicating a three-dimensional structure of the three-dimensional object. The three-dimensional object information 361 includes information about a shape, a position, a color, and the like of the three-dimensional object to be output to the display unit.

The face rectangle detection unit 310 included in the control unit 300 detects a rectangle (for example, a rectangle containing the eyes or a rectangle containing both the eyes and the nose) corresponding to a portion of the operator's face in the captured image 341 obtained by the imaging unit 104, and obtains the face rectangle information 351. The face rectangle information 351 includes such information as coordinates of a predetermined point (for example, an upper left point) of the face rectangle and information about a width and a height of the face rectangle. Coordinates of diagonal points of the face rectangle may be used instead of the width and height information. A related art technique such as the one disclosed in Japanese Unexamined Patent Application Publication No. 2005-284487 mentioned above may be used as a method of detecting the face rectangle. For instance, a large number of sets of face information are learned beforehand to create dictionary data for face detection. Next, input captured image information is compared with the information stored in the face detection dictionary while scaling the captured image information, and similar portion determination is repeated to thereby detect the face rectangle. By using this method, it is possible to extract information about face elements such as the eyes, the nose, and the mouth from the captured image information and rapidly detect positions of these face elements and consequently an area of the face as the face rectangle information. The face rectangle information reflects a position and a distance of the operator's face relative to the imaging unit 104 and changes of the position and the distance, as described later.

The three-dimensional object projection viewpoint calculation unit 311 calculates a position of a three-dimensional object projection viewpoint relative to the three-dimensional object on the basis of the detected face rectangle information. For example, the three-dimensional object projection viewpoint calculation unit 311 determines an angle and a distance of the projection viewpoint, where an image of the three-dimensional object as viewed from the determined projection viewpoint is to be projected on a two-dimensional plane.

The projection image generation unit 312 generates the three-dimensional object projection image 120 using the three-dimensional object information 361, according to the projection viewpoint output from the three-dimensional object projection viewpoint calculation unit 311. The projection image generation unit 312 generates the projection image obtained by projecting the three-dimensional object on a predetermined projection plane (the display screen or a virtual plane parallel to the display screen).

The projection image display instruction unit 313 instructs the display unit 103 to display the projection image generated by the projection image generation unit 312, on the display screen.

The display unit 103 displays the image designated by the projection image display instruction unit 313.

Figure 4A:
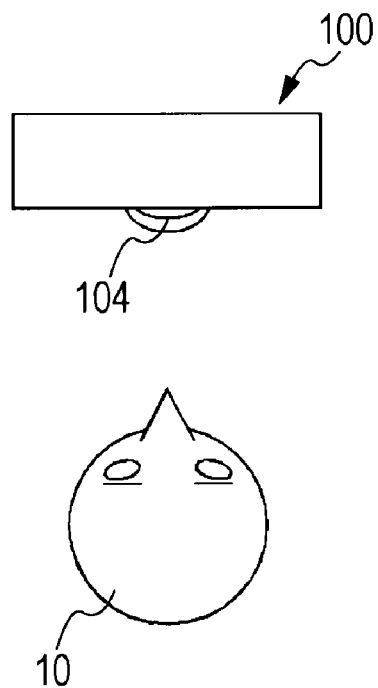
FIGS. 4A and 4B illustrate an example of a relationship between captured image information and an operator's face image contained in the captured image in the embodiment of the present invention.
Figure 4B:
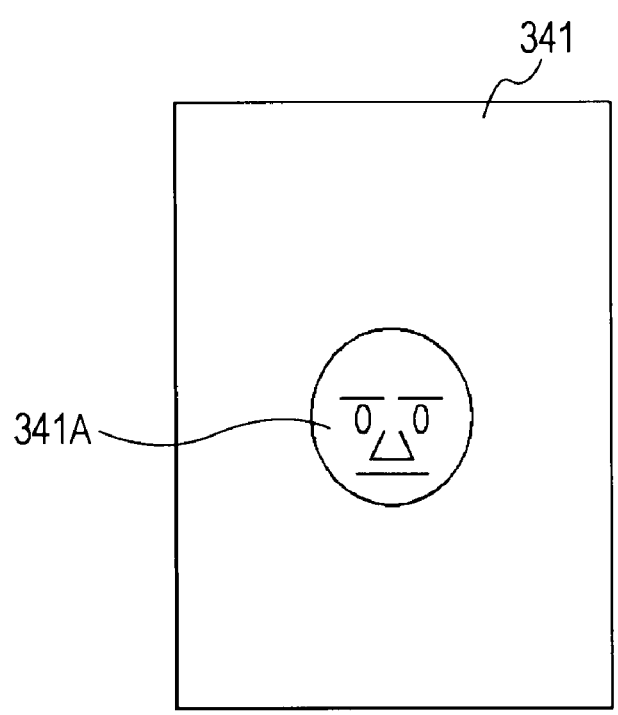
Figure 5A:
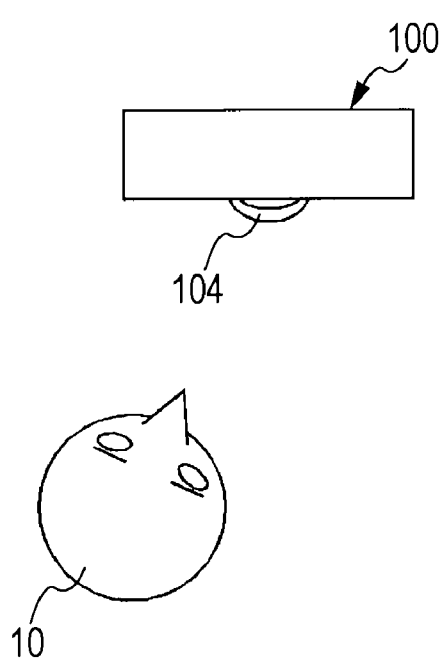
FIGS. 5A and 5B illustrate another example of the relationship between the captured image information and the operator's face image contained in the captured image in the embodiment of the present invention.
Figure 5B:
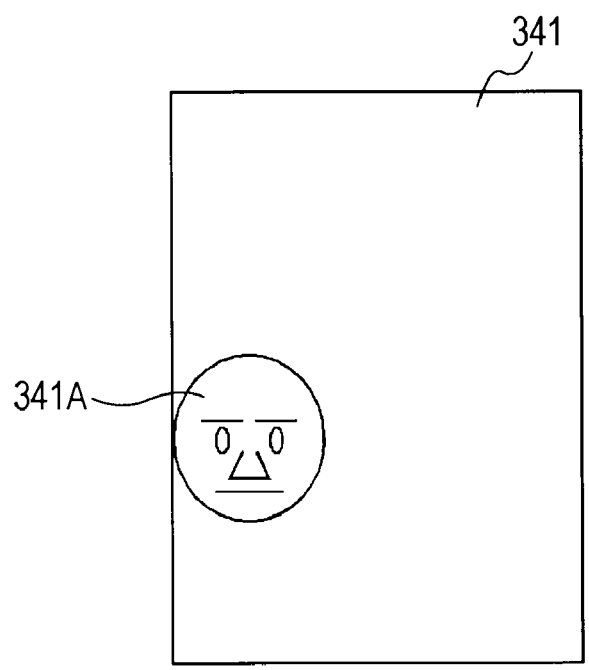
Figure 6A:
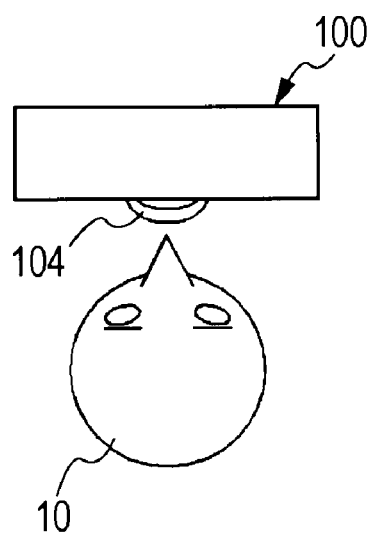
FIGS. 6A and 6B illustrate still another example of the relationship between the captured image information and the operator's face image contained in the captured image in the embodiment of the present invention.
Figure 6B:
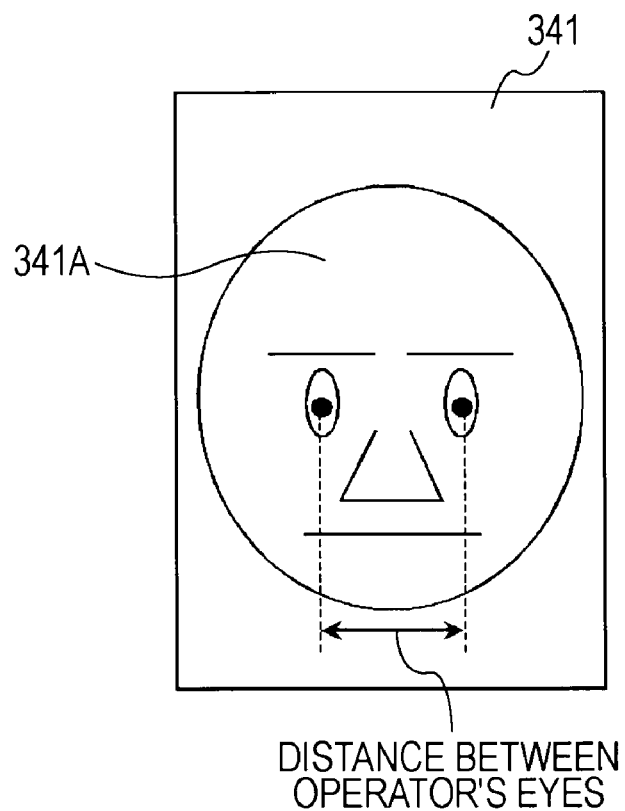

FIGS. 4A to 6B each show a relationship between the captured image information and the operator's face image contained in the captured image. The following describes how an actual position of the operator's face can be estimated on the basis of the captured image information according to such a relationship. FIGS. 4A, 5A, and 6A each show a positional relationship between the mobile terminal and the operator as seen from above. Each of FIGS. 4B, 5B, and 6B shows the captured image 341 held in the captured image holding unit 340 in the situation shown in the corresponding one of FIGS. 4A, 5A, and 6A.

The face rectangle information is detected from the captured image 341 by the related art method as described above.

The following describes a method of estimating the operator's face position according to the positional relationship between the captured image 341 and the face rectangle corresponding to the operator's face image 341A, with reference to FIGS. 4A to 6B.

First, consider the case where the operator 10 (the face of the operator 10) is positioned in front of the mobile terminal 100 as shown in FIG. 4A. In this case, the operator's face image 341A contained in the captured image 341 is positioned at the center of the captured image 341 as shown in FIG. 4B.

In the case where the operator 10 moves leftward relative to the mobile terminal 100 as shown in FIG. 5A, the operator's face image 341A contained in the captured image 341 is positioned to the left in the captured image as shown in FIG. 5B. In this case, though the operator's face image 341A is positioned to the right in the actual captured image, the operator's face image 341A is shown on the same side as the face of the operator 10 in FIG. 5A for sake of simplicity. When determining the position of the operator's face image 341A relative to the captured image 341, a left-to-right inverted image of the captured image 341 is used, or the position of the operator's face image 341A in the captured image 341 is left-to-right inverted.

As can be understood from the above, by detecting the position of the operator's face image 341A contained in the captured image 341, it is possible to determine in which direction the operator 10 is positioned relative to the imaging unit 104, that is, relative to the mobile terminal 100.

In a case where the operator 10 approaches the imaging unit 104 as shown in FIG. 6A, a size (face size) of the operator's face image contained in the captured image information, in more detail, a distance between the operator's eyes on the captured image as an example, becomes larger relative to the captured image, as shown in FIG. 6B. In actuality, by detecting the face size relative to the captured image using a face detector, the distance between the operator and the imaging unit 104 can be determined. In other words, a change of the distance can be detected on the basis of a change of the face size. Here, the width of the face rectangle can substantially be used as the distance between the eyes which serves as an indicator of the face size. As an alternative, the face size information may be obtained using a distance between other face elements such as the nose and the mouth or the eyebrows or a size of the whole face contained in the captured image information, thereby determining the distance on the basis of the obtained face size information in the same way as above.

Thus, according to the embodiment of the present invention, the position of the operator 10 relative to the imaging unit 104 can be determined from the operator's face image 341A.

The following describes a three-dimensional image generation method according to an embodiment of the present invention, with reference to FIGS. 7, 8, and 9. The captured image and the operator's face image 341A contained in the captured image are shown at the left of each drawing. A relationship between a three-dimensional objet 370 and a three-dimensional viewpoint position 331 used by the projection image generation unit 312 is shown at the center of each drawing, where a projection image generation range 371 is seen from above. The mobile terminal, the display screen, and the three-dimensional object projection image 120 projected on a projection plane 372, as seen from the operator, are shown at the right of each drawing. The three-dimensional viewpoint position 331 is changed in response to a change of the operator's face image 341A. The movement of the three-dimensional viewpoint position 331 relative to the fixed projection plane 372 causes the projection image generation range 371 to be deformed, as a result of which the projection image shown at the right is changed. In more detail, a point 382 at which a straight line 380 passing through the three-dimensional viewpoint position 331 and any point 381 of the three-dimensional object 370 intersects the projection plane 372 is a display point of the point 381. In this way, the two-dimensional projection image projected on the projection plane 372 can be made to appear three-dimensional with enhanced realism. Though the projection plane 372 is shown to be located between front and back surfaces of the three-dimensional object 370 as viewed from the three-dimensional viewpoint position 331, such a positional relationship is not limited thereto.

Specific examples shown in FIGS. 7, 8, and 9 are described below.

In the example of FIG. 7, the operator's face image 341A is positioned approximately at the center in the captured image. The face rectangle detection unit 310 generates the face rectangle information from the captured image information. In the example of FIG. 7, this face rectangle information indicates that the face of the operator 10 is positioned approximately at the center with respect to the imaging unit 104.

Following this, the three-dimensional object projection viewpoint calculation unit 311 can determine that the operator is positioned in front of the mobile terminal on the basis of the face rectangle information. The three-dimensional object projection viewpoint calculation unit 311 also calculates the three-dimensional viewpoint position 331 based on the relative size of, for example, the distance between the operator's eyes on the captured image with respect to the captured image, and further determines the shape and the position of the projection image generation range 371 on the basis of the three-dimensional viewpoint position 331. In more detail, the projection image generation unit 312 changes the three-dimensional viewpoint position 331 so that the viewpoint position follows the movement of the operator's face along the display screen. The projection image generation unit 312 also changes the three-dimensional viewpoint position 331 so as to change the distance from the three-dimensional object to the three-dimensional viewpoint position 331 in response to the size of the face image relative to the captured image.

An inverted trapezoid shown at the center of FIG. 7 represents the projection image generation range 371. A base of this trapezoid is fixed so as to coincide with an area which is projected on the projection plane 372. The projection image generation range 371 is defined with the base and the three-dimensional viewpoint position 331. Though the center of FIG. 7 shows the projection image generation range 371 in a horizontal direction as seen from above, the same calculation is carried out with respect to a vertical direction, so that the projection image generation range 371 shaped as a frustum of a quadrangular pyramid is calculated.

Following this, the projection image generation unit 312 generates the three-dimensional object projection image 120 on the basis of the projection image generation range 371 and the three-dimensional object information 361.

Lastly, the projection image display instruction unit 313 instructs the display unit 103 to display the generated three-dimensional object projection image 120. As a result, such image as the one on the display screen 110 shown at the right of FIG. 7 is displayed.

In the example of FIG. 8, the operator's face image 341A is positioned at the right end in the captured image. The face rectangle detection unit 310 generates the face rectangle information on the basis of the captured image information. In the example of FIG. 8, this face rectangle information indicates that the face of the operator 10 is positioned to the right with respect to the imaging unit 104.

Following this, the three-dimensional object projection viewpoint calculation unit 311 can determine that the operator is positioned to the right of the mobile terminal on the basis of the face rectangle information. The three-dimensional object projection viewpoint calculation unit 311 also calculates the three-dimensional viewpoint position 331 based on the relative size of, for example, the distance between the operator's eyes with respect to the captured image, and further determines the shape and the position of the projection image generation range 371 on the basis of the three-dimensional viewpoint position 331.

Here, when compared with FIG. 7, the three-dimensional viewpoint position 331 changes as a result of the change in the position of the operator's face image 341A, and the projection image generation range 371 is defined as an inverted trapezoid having the common base as shown at the center of FIG. 8. When the operator's face image 341A moves not only in the horizontal direction but also in the vertical direction, an inverted trapezoid is calculated with respect to the vertical direction as well, and a frustum of a quadrangular pyramid that combines these two inverted trapezoids is defined as the projection image generation range 371.

Following this, the projection image generation unit 312 generates the three-dimensional object projection image 120 on the basis of the projection image generation range 371 and the three-dimensional object information 361.

Lastly, the projection image display instruction unit 313 instructs the display unit 103 to display the generated three-dimensional object projection image 120. As a result, such image as the one on the display screen 110 shown at the right of FIG. 8 is displayed.

In the example of FIG. 9, the operator's face image 341A is positioned approximately at the center in the captured image, but occupies a relatively large area when compared with FIG. 7. The face rectangle detection unit 310 generates the face rectangle information from the captured image information. In the example of FIG. 9, this face rectangle information indicates that the face of the operator is positioned at the center. The three-dimensional object projection viewpoint calculation unit 311 can determine that the operator is positioned in front of the mobile terminal, on the basis of the face rectangle information indicating approximately the center position. The three-dimensional object projection viewpoint calculation unit 311 also calculates the three-dimensional viewpoint position 331 based on the relative size of, for example, the distance between the operator's eyes with respect to the captured image, and further determines the shape and the position of the projection image generation range 371 on the basis of the three-dimensional viewpoint position 331. As shown at the center of FIG. 9, the three-dimensional viewpoint position 331 changes upward in the drawing when compared with the center of FIG. 7, and as a result the projection image generation range 371 defined with the three-dimensional viewpoint position 331 and the fixed base has a shape of an inverted trapezoid with a wider top. An inverted trapezoid is calculated with respect to the vertical direction as well, and a frustum of a quadrangular pyramid that combines these two inverted trapezoids is defined as the projection image generation range 371. The projection image generation unit 312 generates the three-dimensional object projection image 120 on the basis of the projection image generation range 371 and the three-dimensional object information 361. Lastly, the projection image display instruction unit 313 instructs the display unit 103 to display the generated three-dimensional object projection image 120. As a result, such image as the one on the display screen 110 shown at the right of FIG. 9 is displayed.

The above structure has the following effects. A sense of realism can be delivered to the operator by projecting the three-dimensional object on the two-dimensional display screen to obtain the display image of the three-dimensional object in perspective, without using an extra device or instrument other than the mobile terminal including the imaging unit 104. The three-dimensional viewpoint position is calculated using only the position of the operator's face (that is, the face image) relative to the imaging unit 104 (that is, the captured image), which can be equally used even when the operator's posture changes. In addition, by continuously acquiring the captured image information from the imaging unit 104 and reflecting the operator's face position on the projection image, feedback can be provided to the operator regarding the positional relationship between his/her own face and the imaging unit 104. This allows the viewpoint operation to be performed more easily.

Although the embodiments of the present invention have been described above, various modifications and changes can be made in addition to the embodiments described above.

The above description assumes the mobile terminal to be a mobile phone terminal, but the mobile terminal may not necessarily have a phone function. For example, any mobile terminal having a display screen, such as a PDA, a game machine, and a small PC, is applicable. Moreover, though the mobile terminal according to the embodiments of the present invention is preferably a portable-type mobile terminal, the mobile terminal is not limited to the portable type.

According to the embodiments of the present invention, there are also provided a computer program causing a computer to perform the functions described in the above embodiments, and a recording medium which stores the program in a computer readable manner. Examples of the recording medium for supplying the program include a magnetic recording medium (a flexible disk, a hard disk, magnetic tape, and the like), an optical disk (a magneto-optical disk such as an MO or a PD, a CD-ROM, a CD-R, a CD-RW, a DVD-ROM, a DVD-RAM, a DVD+R, a DVD-R, a DVD-RW, a DVD+RW, and the like), a semiconductor storage, paper tape, and so on.

The present application contains subject matter related to that disclosed in Japanese Priority Patent Application JP 2008-295582 filed in the Japan Patent Office on Nov. 19, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A terminal apparatus comprising:
a display unit configured to display a projection image of a three-dimensional object on a two-dimensional display screen;
an imaging unit configured to capture an image of an operator who is in a state of viewing the display screen;
means for changing a viewpoint position relative to the three-dimensional object in response to a position of an image of the operator's face relative to the captured image; and
projection image generation means for obtaining a projection image generated by projecting each portion of the three-dimensional object viewed from the viewpoint position onto a predetermined projection plane.

2. The terminal apparatus according to claim 1, wherein the projection image generation means changes the viewpoint position so that the viewpoint position follows a movement of the operator's face along the display screen.

3. The terminal apparatus according to claim 1, wherein the projection image generation means changes the viewpoint position so that a distance from the three-dimensional object to the viewpoint position changes in response to a size of the image of the operator's face relative to the captured image.

4. The terminal apparatus of claim 1, further comprising:
a detecting unit configured to detect a position of the operator's face in the captured image,
wherein the means for changing changes the viewpoint position relative to the three-dimensional object in response to the position of the operator's face in the captured image.

5. A display control method for displaying a three-dimensional object in a terminal apparatus that includes an imaging unit and a display unit having a two-dimensional display screen, the display control method comprising the steps of:
capturing an image of an operator who is in a state of viewing the display screen by the imaging unit;
changing a viewpoint position relative to the three-dimensional object in response to a position of an image of the operator's face relative to the captured image;
obtaining a projection image generated by projecting each portion of the three-dimensional object viewed from the viewpoint position onto a predetermined projection plane; and
displaying the projection image on the display screen.

6. The method of claim 5, further comprising:
detecting a position of the operator's face in the captured image,
wherein the changing includes changing a viewpoint position relative to the three-dimensional object in response to a position of the operator's face in the captured image.

7. A non-transitory computer readable medium having stored thereon a display control program for displaying a three-dimensional object in a terminal apparatus that includes an imaging unit and a display unit having a two-dimensional display screen, the display control program causing a when executed by a computer causes the computer to execute steps of:
capturing an image of an operator who is in a state of viewing the display screen by the imaging unit;
changing a viewpoint position relative to the three-dimensional object in response to a position of an image of the operator's face relative to the captured image;
obtaining a projection image generated by projecting each portion of the three-dimensional object viewed from the viewpoint position onto a predetermined projection plane; and
displaying the projection image on the display screen.

8. The computer readable medium of claim 7, further comprising:
detecting a position of the operator's face in the captured image,
wherein the changing includes changing a viewpoint position relative to the three-dimensional object in response to a position of the operator's face in the captured image.

9. A terminal apparatus comprising:
a display unit configured to display a projection image of a three-dimensional object on a two-dimensional display screen;
an imaging unit configured to capture an image of an operator who is in a state of viewing the display screen;
a changing unit configured to change a viewpoint position relative to the three-dimensional object in response to a position of an image of the operator's face relative to the captured image; and
a projection image generator configured to obtain a projection image generated by projecting each portion of the three-dimensional object viewed from the viewpoint position onto a predetermined projection plane.

10. The terminal apparatus of claim 9, further comprising:
a detecting unit configured to detect a position of the operator's face in the captured image,
wherein the changing unit changes a viewpoint position relative to the three-dimensional object in response to the position of the operator's face in the captured image.

* * * * *